May 22, 1928. M. EPSTEIN Re. 16,972

LADY'S CAP

Original Filed April 5, 1926

Inventor

Maurice Epstein.

By H. J. O'Brien

Attorney

Reissued May 22, 1928. Re. 16,972

UNITED STATES PATENT OFFICE.

MAURICE EPSTEIN, OF DENVER, COLORADO.

LADY'S CAP.

Original No. 1,602,889, dated October 12, 1926, Serial No. 99,743, filed April 5, 1926. Application for reissue filed November 19, 1926. Serial No. 149,547.

This invention relates to improvements in caps.

It is the object of this invention to produce a cap of simple construction that shall be of neat appearance, which may be adjusted to fit various sizes of heads and which may be reversed if desired.

My invention, briefly described, consists of a crown portion formed double and of different colored material so that it may be reversed, if desired. Both sides are formed from six pieces and the edges of the seams are to the inside so that whatever side is on the outside will have a finished appearance. A brim made of one or more thicknesses has one edge attached to the lower edge of the crown throughout substantially the entire distance, a space being left unattached between the ends of the brim. A loop is attached to the crown midway between the points where the attachment of the brim starts and this loop is adapted to receive the ends of the brim so as to form an adjustable connection that simulates a bow.

In order more clearly to describe my invention, I shall have reference to the accompanying drawing in which the preferred embodiment has been illustrated and in which.

Figure 1:
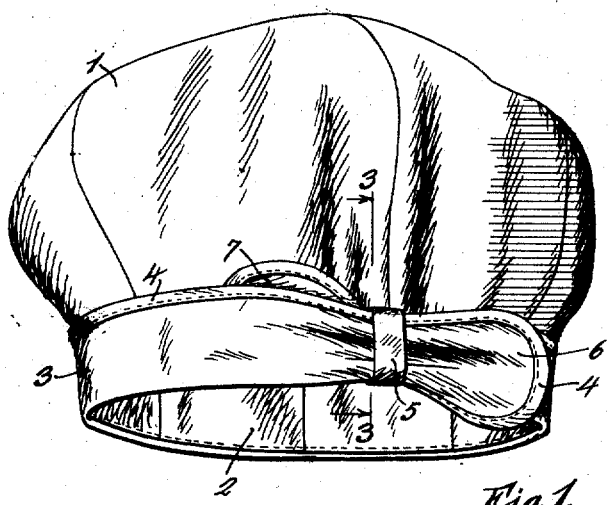
Fig. 1 is a view showing the parts in the position in which they are when the cap is worn.
Figure 2:
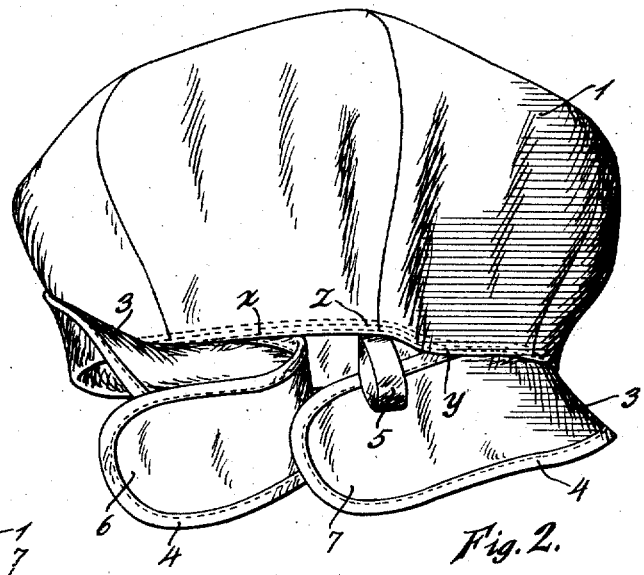
Fig. 2 is a view showing the ends of the brim withdrawn from the loop.
Figure 3:
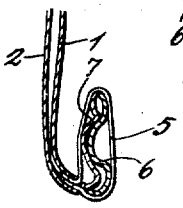
Fig. 3 is a section taken on line 3—3, Fig. 1.

Numeral 1 represents the outer fabric layer of the crown and 2 the inner layer. The two crown portions are preferably constructed exactly alike, but of different colored material and have the raw edges on the inside so that whichever side is on the outside will have a smooth finished appearance. A brim 3, which may be made of a single thickness or of two thicknesses of suitable material has one side attached to the edge of the crown from point $x$ and $y$ but being unattached along the space $x$, $z$, $y$. The brim has been shown as provided with a binding 4 sewed to its free edge. A loop 5 is attached to the crown at $z$ half way between points $x$ and $y$ and serves to receive the ends 6 and 7 of the brim and to hold them in the manner shown in Figures 1 and 3. The ends of the brim may be slid relative to each other so as to adjust the size of the cap. The ends of the loop 5 are secured between the parts 1 and 2 (Fig. 3) so that it may be bent to either side. The edge of the brim is also secured between the edges of the crown pieces so that the appearance will not be altered when the cap is reversed.

I want to call particular attention to the construction just described which embodies the loop because this permits of ready adjustment of size and gives a pleasing effect and at the same time permits the cap to be turned inside out without altering the appearance except in respect to the color. The loop may be made of any suitable material such as silk or elastic webbing or even of metal, the only requirement being that it shall serve the function for which it is intended.

Having thus described my invention what I claim as new is:

1. A reversible cap having a brim whose edge is secured in place to the crown for a distance somewhat less than the entire extent of the crown and leaving a free flexible edge between the points where the brim ceases to be attached to the crown, said brim being longer than the distance about the crown where it is attached thereto so as to leave two free ends, and a loop attached to said flexible edge and adjustable to extend downwardly from the crown and to each side thereof, whereby it is adapted to receive and hold the ends of the brim in either position of reversal.

2. A reversible cap having a brim whose edge is secured in place to the crown for a distance somewhat less than the entire extent of the crown and leaving a free flexible edge between the points where the brim ceases to be attached to the crown, said brim being longer than the distance about the crown where it is attached thereto so as to leave two free ends, and a loop attached at one end to the said flexible edge and adjustable to extend downwardly from the crown and to each side thereof, whereby it is adapted to receive and hold the ends of the brim in either position of reversal.

3. A cap having a crown formed from two thicknesses of material, a brim having one side edge secured in place to the crown for a distance of nearly the entire extent of the crown, but leaving a free flexible edge between the points where the brim ceases to be attached to the crown, said brim being longer than the distance about the crown where it is attached thereto so as to leave two free ends, and a loop attached at one end to said flexible edge and adjustable to extend downwardly below the crown and to each side thereof, whereby it is adapted to receive and hold the ends of the brim so as to permit adjustment of the size.

4. A reversible cap having a crown formed from two thicknesses of differently colored material, a brim having one side edge secured in place between the edges of the crown for a distance of nearly the entire extent of the crown but leaving a space unattached between the points where the brim ceases to be attached to the crown, said brim being longer than the distance about the crown where it is attached thereto so as to leave two free ends and a loop attached to the crown between the two thicknesses of material midway of the space between the points where the brim is attached, said loop being adapted to receive and hold the ends of the brim so as to permit adjustments of the size.

5. A reversible cap having a crown formed from two thicknesses of differently colored material, a brim having one side edge secured in place to the crown for a distance of nearly the entire extent of the crown but leaving a space unattached between the points where the brim ceases to be attached to the crown, said brim being longer than the distance about the crown where it is attached thereto so as to leave two free ends, and a loop attached to the crown between the two thicknesses of material midway of the space between the points where the brim is attached, said loop being adapted to receive and hold the ends of the brim so as to permit adjustments of the size.

In testimony whereof I affix my signature.

MAURICE EPSTEIN.